United States Patent [19]

Fridge et al.

[11] Patent Number: 4,593,368
[45] Date of Patent: Jun. 3, 1986

[54] TECHNIQUE FOR MEASURING VERY SMALL SPACINGS

[75] Inventors: D. Alan Fridge, Glendale; Kenneth A. Miller, Simi Valley, both of Calif.

[73] Assignee: Kollmorgen Technologies Corporation, Melville, N.Y.

[21] Appl. No.: 617,123

[22] Filed: Jun. 4, 1984

[51] Int. Cl.[4] .............................................. G01B 11/14
[52] U.S. Cl. .................................... 364/525; 364/561; 356/357; 360/75
[58] Field of Search ............... 364/561, 563, 582, 525, 364/728; 356/357, 358, 382; 360/75, 103, 109

[56] References Cited

U.S. PATENT DOCUMENTS 3,601,492 8/1971 Reichard ............................ 356/357
3,751,643 8/1973 Dill et al. ............................ 364/525

OTHER PUBLICATIONS

Bowen et al., "Interferometer Alignment Tool", IBM Technical Disclosure Bulletin, vol. 15, No. 12, pp. 3691-3692, May, 1973.
Heinrich, "Semi-Automatic Flight Height Measuring for Magnetic Heads", IBM Technical Disclosure Bulletin, vol. 20, No. 4, p. 1503, Sep. 1977.
Makosch et al., "Measuring the Flight Height of Magnetic Heads on Magnetic Disks", IBM Technical Disclosure Bulletin, vol. 15, No. 4, pp. 1322-1323, Sep. 1972.

Primary Examiner—Gary Chin
Attorney, Agent, or Firm—Poms, Smith, Lande & Rose

[57] ABSTRACT

The spacing between two surfaces such as the space between a glass disk and a magnetic head or slider is measured by directing light from a broad spectrum light source onto the two surfaces, and combining the reflected light, with the light at different frequencies being combined constructively and destructively. The combined signals are analyzed at a large number of wavelengths to give a plot of intensity vs. wavelength, and the wavelength or wavelengths of maximum intensity (and constructive interference) and/or minimum intensity (destructive interference) are identified. For a glass disk and a metal slider with normal incidence, the light intensity minima occur at $d=(\frac{1}{2})nL$ and maxima at $d=(\frac{1}{2})(n-\frac{1}{2})L$, where d is the separation, L is the wavelength and n is a positive integer indicating the order. The actual plot of intensity vs. wavelength is correlated with the theoretical intensity vs. wavelength function, and this correlation or curve fitting is carried forward to calculate the spacing "d" to any desired accuracy within the limits of the input data. The entire process for determining the spacing takes only a few seconds. In accordance with one useful relationship for example, the spacing "d" is shown to be equal to $$\frac{1}{4\left(\frac{1}{L_1} - \frac{1}{L_2}\right)}$$

where $L_1$ and $L_2$ are successive wavelengths where the intensity is a maximum and a minimum, or vice versa. Other examples of curve fitting or correlation, both simpler and more complex are developed. After the spacing "d" has been determined, the spacing may then be increased or decreased toward a desired value and the method repeated.

29 Claims, 11 Drawing Figures

TECHNIQUE FOR MEASURING VERY SMALL SPACINGS

FIELD OF THE INVENTION

This invention relates to the measurement of relatively small distances.

BACKGROUND OF THE INVENTION

In the field of magnetic hard disk recording, it is important that the magnetic reading heads, or sliders, be located at a predetermined, known, relatively small spacing from the rotating magnetic disk upon which the digital information is stored. In practice, after the disk is rotating at normal relatively high speed, the magnetic heads are advanced and are allowed to seek their natural dynamic "flying" height above the disk, as a result of the balance between (1) a spring biasing force urging the slider toward the disk, and (2) air pressure resulting from the high speed rotation of the disk relative to the slider which tends to push the slider away from the disk. The "flying height" of the slider has been reduced in modern hard disk memories, from more than 1000 nanometers, (in the order of 40 micro-inches) down to close to 100 nanometers (in the order of 4 micro-inches).

It has been proposed to estimate flying heights of sliders by using a glass or quartz disk substituted for the hard magnetic disk, by directing illumination substantially normal to the disk to the interface between the transparent disk and the slider, and observing the interference fringes and color changes using Newton's color scale (as set forth in Newton's "OPTICKS") observed in the combined reflections from the two adjacent surfaces. However, such techniques require highly skilled personnel and are relatively inaccurate.

Accordingly, a principal object of the present invention is to provide a substantially automatic method and apparatus for measuring spacings extending to substantially less than 1000 nanometers with one nanometer being equal to $10^{-9}$ meters.

SUMMARY OF THE INVENTION

In accordance with one specific method illustrating the principles of the present invention as applied to the measurement of the spacing of a magnetic head or slider above the surface of a rotating disk, in a magnetic hard disk memory system, the following steps may be used:

(1) A transparent disk made of a material such as glass or quartz is substituted for the hard magnetic disk, and is rotated at the normal speed for the system with the slider in its normal operative position.

(2) Broad spectrum light from a source such as a Xenon lamp directed substantially normal to the surface of the transparent disk, through the disk and onto the slider, and the light reflected from the slider and from the surface of the disk close to the slider, is combined, and spectrally analyzed for constructive and destructive interference at each of a large number of wavelengths, to provide a plot of intensity vs. wavelength. Incidentally, as one step in the method, the intensity vs. wavelength spectrum of the light source is initially determined and stored; and the plot of the reflected intensity vs. wavelength uses the ratio of the reflected light at each wavelength to the intensity of the source at each wavelength to give a "normalized" plot of intensity vs. wavelength.

(3) The minimum and maximum points in the normalized response vs. frequency characteristic are identified.

(4) Taking into account the phase shift of 180 degree which occurs at the interface between the quartz plate and the slider when the two are touching, an initial determination of the spacing "d" is made using one of the following two formulae:

For intensity minima:

$$d = (\tfrac{1}{2})nL \tag{1}$$

For intensity maxima:

$$d = (\tfrac{1}{2})(n - \tfrac{1}{2})L \tag{2}$$

where d is spacing between the slider and the adjacent surface of the transparent disk;
L is the wavelength of the light where the minimum or maximum occurs; and
n is 0 or a positive integer.

(5) In Step 4 the integer n is arbitrarily selected, and a value of n equal to "1" may be initially used.

(6) The initially calculated value of the spacing "d" is checked against other maxima or minima observed within the measured spectrum, and if a check is found, the value of d is confirmed. If a check is not found, the next higher value of n is employed, and a check is made, and so on, until a valid determination of "d" is checked.

(7) Within a few seconds, the true value of "d" is displayed, or printed out; and if desired, or if necessary, the slider height may be changed either automatically by a servomotor changing the spring biasing force on the slider, or by a manual adjustment.

From a more general standpoint, it may be shown that the amplitude function for the type of geometry under consideration is equal to:

$$A_o R_1 - A_o T_1^2 R_2 \sin\left(\frac{4\pi d}{L} + P\right) \tag{3}$$

where:

$A_o$ is the input amplitude,
$R_1$ is the reflection coefficient at the glass surface,
$T_1$ is the transmission coefficient at the glass surface,
$R_2$ is the reflection coefficient at the slider surface,
P is the total phase shift (independent of frequency) which may occur at the reflective surface and/or the medium change, and
L and d are the wavelength and distance as noted above.

For the present case, where P is equal to 180 degrees, and the cosine of any angle plus 180 degrees is equal to the sine of that angle, equation (3) becomes:

$$A_o R_1 - A_o T_1^2 R_2 \cos\left(\frac{4\pi d}{L}\right) \tag{4}$$

and this may be simplified to:

$$C_o \left[1 - C_1 \cos\left(\frac{4\pi d}{L}\right)\right] \tag{5}$$

where $C_0$ and $C_1$ are constants.

And now the intensity function is the square of function (5) as follows:

$$C_0^2 \left[ 1 - C_1 \cos\left(\frac{4\pi d}{L}\right) \right]^2 \quad (6)$$

This intensity function is similar to the amplitude function in that the location of the maxima and minima are unchanged; however, the shape of the function between the maxima and minima is altered.

Equations (1) and (2) are derived from (6) by noting that the cosine function has values of "1" and "−1" to give maxima and minima, respectively.

It is also noted in passing that the assignee of the present invention markets a product which is called a "Fast Spectral Scanning System" and designated PR-710M, (703A/702 AM System) which provides a normalized spectral analysis of reflected light. Accordingly, it may be employed as one portion of the system of the present invention. A brochure describing this product is available from Photo Research, a Division of Kollmorgen Corporation 3000 No. Hollywood Way, Burbank, Calif. 91505.

The output from the "Fast Spectral Scanning System" is a plot of intensity vs. wavelength throughout the visible light spectrum and extending into the ultraviolet and infrared spectral regions, from wavelengths below 400 nanometers (4,000 Angstrom units) to well above 700 nanometers. As part of the plotting technique, the spectral characteristics of the light source being employed is initially stored; and then the intensity of the reflected light is measured, and the displayed intensity is the ratio of the reflected light to the intensity of the light source at the wavelength under consideration, so a "normalized" plot of intensity versus wavelength is obtained.

When the intensity of the reflected light from the slider and the adjacent surface of the transparent disk is measured with their constructive and destructive interference, the result is a plot of intensity vs. wavelength having maxima and minima. This is of course to be expected from the amplitude and the intensity equations (5) and (6). From these equations, the maxima and minima are clearly repetitive functions of the spacing "d" and the wavelength "L". Since $C_0$ and $C_1$ are constants determined by the materials of the transparent disk and the slider, equation (6) may be used to predict the observed spectral energy distribution for any spacing "d".

From the most general standpoint, all that remains to be done is to determine the value of the one free parameter "d" which produces the best correspondence or correlation between the measured and the predicted spectral energy distributions. This type of curve fitting is a well known problem and can be accomplished to any desired degree of accuracy within the constraints of the accuracy of the data which is available. Once the "curve fitting" has been accomplished, the measurement of the actual flying height has been determined. In the present case, and as will be discussed in some detail below in connection with FIGS. 3 through 8, the first step in correlation or curve fitting might be to identify the maxima and/or minima in the light spectrum being analyzed.

It is further noted that the "curve fitting" or analysis of the correspondence between the measured curve and the theoretical characteristics need only be sufficient to calculate the spacing "d", to the desired or required level of accuracy. Normally further calculations may be employed to obtain a slightly more accurate value of the spacing "d", in cases where a high degree of accuracy in determination is needed.

However, in many cases all that is needed is the value of the wavelength at one minimum or maximum of the curve, and the wavelength at the next successive minimum or maximum. As will be developed below, the spacing for such cases is determined by the following equation:

$$d = \frac{1}{4\left(\frac{1}{L_1} - \frac{1}{L_2}\right)} \quad (7)$$

where "d" is the spacing and $L_1$ and $L_2$ are the wavelengths at successive minima or maxima and the next successive minimum or maximum point.

Further, it has been determined that, when there is only one minimum and no maximum in the spectrum, the spacing "d" is equal to L/2 and when there is only one maximum and no minimum, the spacing "d" is equal to L/4 where the wavelength L is located at the minimum or the maximum. These formulae arise from a recognition that the single maximum or minimum in the visible light spectrum means that the spacing is very small, so that n is equal to 1 in equation (1) and n is equal to 0 in equation (2).

Incidentally, equation (7) may be readily derived from a recognition that the difference in phase between a maximum intensity point and a minimum intensity point is equal to 180 degrees or $\pi$ in the expression relating to the cosine function in function (4). Accordingly, $$\frac{4\pi d}{L_1} - \frac{4\pi d}{L_2} = \pi \quad (8)$$

where "d" is the spacing, and $L_1$ and $L_2$ are the wavelengths at successive extreme points (maximum or minimum points).

With algebraic simplification, expression (8) becomes expression (7).

Following in "curve fitting" and rough determination of "d" by any of the foregoing methods, more accurate determination may be accomplished by employing the chosen curve fit and calculating additional points, either at successive maxima and minima, or at intermediate points along the intensity function of function (6), using the calculated value of the spacing "d" and slightly increased and decreased values thereof, to determine if a better "fit" can be obtained. As one technique for obtaining a more accurate determination of the spacing "d" when a number of maxima and minima are present in the spectral intensity curve, equation (7) may be used successively for each pair of extreme (maximum or minimum) points, and the results averaged.

The present invention is not limited to the measurement of slider heights above the surface of high speed rotating disks, but may be employed generally to measure the distance between two surfaces by the impingement of light on the two surfaces, and the analysis of the constructive and destructive interference resulting from the combined waves. This more general method would again involve the determination of any absolute phase shift (independent of frequency) of one wave relative to other of the two waves which are being combined; and then a spectral analysis of the combined signal for the frequencies at which one or more maxima and/or minima occur. As noted above, for each frequency, these maxima and/or minima recur at successive increments of the spacing of one-half wavelength or successive increments of total path length of one wavelength, where the path length is normally twice the spacing between the surface under consideration. The correlation or curve fitting process and the determination of the spacing "d" would then proceed in any of the alternative sequences as outlined above.

The system could thus be used to measure the thickness of certain semiconductor layers, optical coatings, or tolerances in certain mechanical parts; and is not limited to the flying height measurement example disclosed in detail in the present specification.

As one minor sidelight, the matter of the phase shift "P" of 180 degrees, independent of frequency, which appears in function (3), and which occurs in the illustrative system involving a magnetic recording head or slider, may be observed visually, when the slider is allowed to touch the glass or quartz disk. The optical appearance is one of darkness or black, indicating the 180 degree phase shift, or destructive interference, when the two parts are touching.

Other objects, features, and advantages of the invention will become apparent from a consideration of the following detailed description, and from the accompanying drawings.

DETAILED DESCRIPTION

Figure 1:
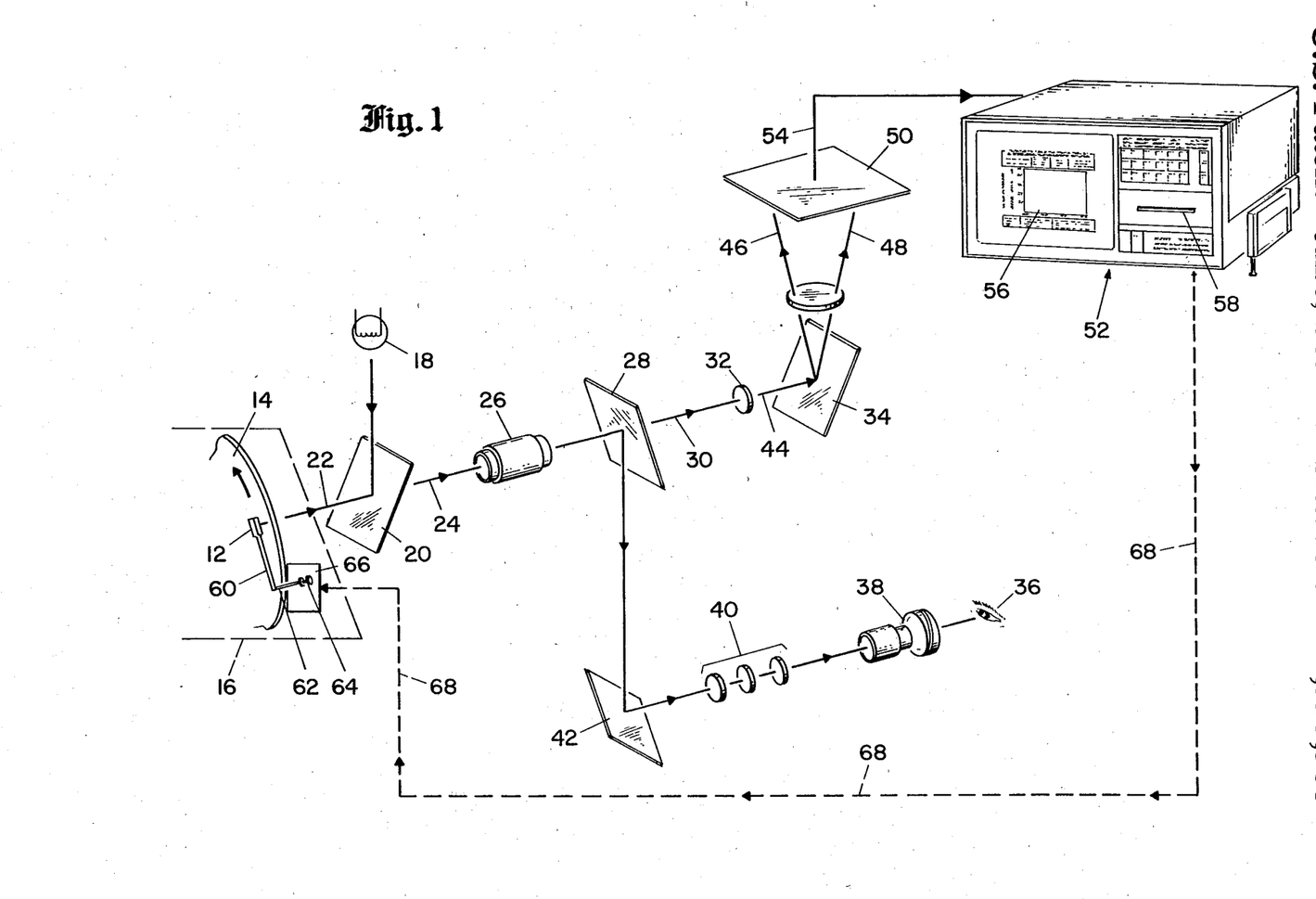
FIG. 1 is a schematic showing of a system illustrating the principles of the present invention.

Referring more particularly to the drawings, FIG. 1 shows an overall schematic drawing of a system for measuring the flying height or relatively small spacing between the slider or magnetic head 12 and the glass disk 14. As mentioned above, the glass disk 14 is mounted in a magnetic disk storage unit (or tester) 16 in place of the usual hard magnetic disk employed when the unit is in actual operation.

A white light source 18, which may for example be a tungsten or a xenon lamp, directs broad spectrum light onto the beam splitter or partially silvered mirror 20, from which it is directed along path 22 toward that area of the glass or quartz disk 14 behind which the slider 12 is "flying".

Signals reflected from the slider 12 and the adjacent surface of transparent disk 14 interfere constructively and destructively as they proceed to the right along path 22 through the partially silvered mirror 20, along path 24 through objective lens 26, through the Pritchard apertured mirror 28 along path 30, through lens 32 to the diffraction grating 34.

Incidentally, a viewer indicated by the eye 36 may verify the direction of the beam 22 onto the proper area of the disk 14 backed by the slider 12 by the optical system including the eyepiece 38, lenses 40, mirror 42 and the Pritchard apertured mirror 28. A very small beam of reflected light to be processed passes through an aperture in the Pritchard mirror 28. The remaining light is directed downward for viewing by observer 36. Accordingly, if the beam 22 is not being directed onto slider 12, it may be shifted, along with the remainder of the optical system, to the proper position as observed and confirmed by viewer 36.

The diffraction grating 34 disperses the reflected beam of light 44 incident thereon into its constituent wavelengths so that the infrared light is directed to one extreme angle and the ultraviolet light is deflected to the other extreme angle as indicated by arrows 46 and 48 in FIG. 1. A diode array 50 serves to separately detect the intensity of light at each of a large number of different wavelengths, as indicated, for example, in FIGS. 3 through 7. It is understood that the Photo Research system mentioned above provides separate intensity readings at each of 256 separate wavelengths extending across the entire visible light spectrum and into the adjacent infrared and ultraviolet spectral regions.

In FIGS. 3 through 7, the normalized intensity is plotted against wavelength by the system shown in FIG. 1, particularly the unit 52, which is part of the "Fast Spectral Scanning System" available from a Division of the assignee of the present invention, as mentioned above. A copy of the brochure describing the operation of the system will be forwarded to the Patent Office to become part of the file history of this patent application.

Signals representing intensity at each of 256 wavelengths are transmitted on the data bus 54 to the fast spectral scanning unit 52. The nature of the system included within unit 52 will be described in greater detail in connection with FIG. 8 of the drawings. For the present, it is sufficient to note that the normalized intensity data is calculated, and displayed on the cathode ray tube 56. Program control information may be supplied either by a programmed Read Only Memory (PROM) or by the floppy disk 58 which may be inserted into the scanning unit 52.

Turning now to different aspects of the system, the slider 12 may be mounted on an arm 60 which in turn may be pivotally mounted on a shaft 62 to which a coil spring 64 is attached to bias the slider 12 toward the disk 14 when the system is operative. As mentioned hereinabove, the force tending to bias the slider 12 toward the disk 14 is counterbalanced by the air pressure generated by the high speed rotation of the disk 14. The flying height of the slider, or its spacing from the disk 14, is determined largely by the spring pressure exerted by spring 64 tending to rotate arm 60 toward the plate 14. This spring pressure is normally adjustable, to vary the flying height, and to control the flying height to the proper position for magnetic reading and recording on the hard magnetic disk normally included within the system 16.

Once the flying height has been determined by the system as shown in FIG. 1, the height of the slider 60 may be readjusted by the control mechanism 66 indicated schematically as a box included within the hard disk memory unit 16, in FIG. 1. The dashed line 68 extending from the fast scanning unit 52 to the control unit 66 indicates schematically the readjustment of the flying height after initial calculation. This would normally be done manually by an adjustment within unit 66, but it could also be accomplished by a suitable servo-mechanism which could be included within the control unit 66, so that the flying height would be automatically adjusted to the desired level.

Figure 2:
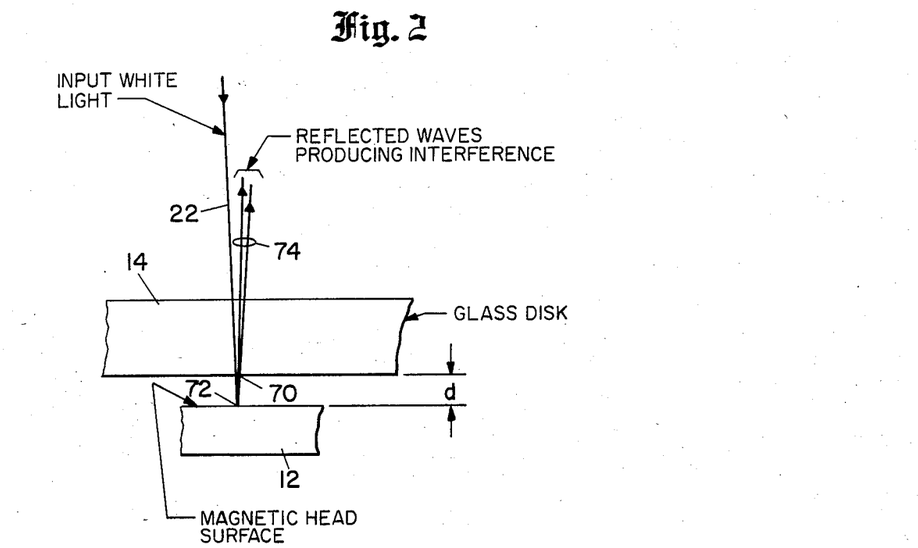
FIG. 2 is a diagram showing the critical optical paths relating to the distance "d" to be measured.

FIG. 2 indicates diagrammatically the optical path adjacent the glass disk 14 and the slider 12. More specifically, the input broad spectrum light beam 22 is applied substantially normally to the glass disk 14 in the area where the slider 12 is located behind the disk 14. Some of the incident energy is reflected from the inner surface of the glass disk 14 at a point 70, and additional light which passes through the glass disk 70 is reflected from the slider 12 at point 72. The light reflected from point 70 and point 72 are combined as indicated by the rays 74 and the resultant light waves 74 combine both constructively and destructively to produce the various intensity vs. wavelength spectral patterns set forth in FIGS. 3 through 7, depending on the spacing between the glass disk 14 and the slider 12.

Now, in the following discussion, the spacing corresponding to each of the spectral plots of FIGS. 3 through 7 will be analyzed. In FIGS. 3 through 7, the wavelength is specified in nanometers, or billionths of a meter. The spectral range shown, from somewhat below 400 nanometers to well above 700 nanometers is the visible spectrum, with the shorter wavelengths being blue and the longer wavelengths ranging from red into purple. It is to be understood, of course, that shorter wavelengths ranging down into the ultraviolet, and longer wavelengths ranging up into the infrared spectral area may be included. The system identified above takes 256 separate intensity readings over the spectral range. With regard to flying heights for the magnetic head or the slider, it is customary to specify these flying heights in terms of micro-inches. Accordingly, it is useful to note that one micro-inch is equal to approximatel 25.4 nanometers, and this conversion figure will be below.

Figures 9, 10:
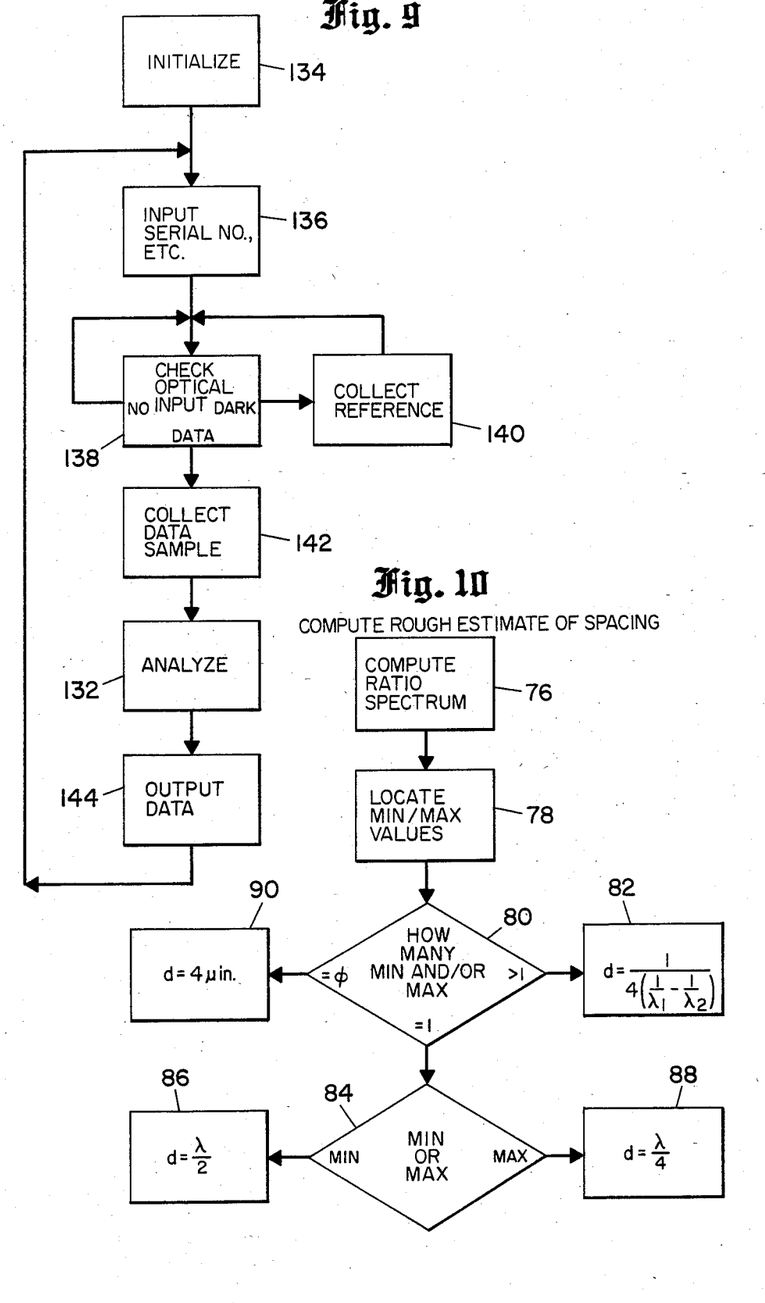
FIGS. 9, 10 and 11 are sequence diagrams indicating the steps involved in determining the spacing of the surfaces under consideration.

We will now proceed to analyze the flying heights represented by FIGS. 3 through 7, using the logical steps set forth in the sequence of FIG. 10, and also in formula (7) and the associated text material. Shifting for a moment to a consideration of FIG. 10, it may be noted that the sequence steps involve first a calculation of the normalized intensity at each point throughout the spectrum, as indicated by the initial sequence step 76. The next step is to locate the minimum and the maximum values, as indicated by block 78. Then, depending on how many minimum points and/or maximum points are present, as indicated by the diamond 80, different calculations are performed for determining the flying height. Thus, if there are more than one combined extreme points, minimum and maximum, the calculation indicated by block 82 and equation (7) is performed, using adjacent extreme points. Incidentally, the equation set forth in block 82 has been set forth above, along with the mode of its derivation, in equations (7) and (8). If there is only one extreme point, either a minimum or a maximum, the next program step is indicated by the diamond 84, indicating that calculation shown in block 86 is accomplished if the extreme point was a minimum, while if the extreme point was a maximum, then the calculation indicated by block 88 is accomplished. Finally, if there were no maximum or minimum points, the spacing must be very small, and an arbitrary estimate of 4 micro-inches is indicated by the block 90.

Figure 3:
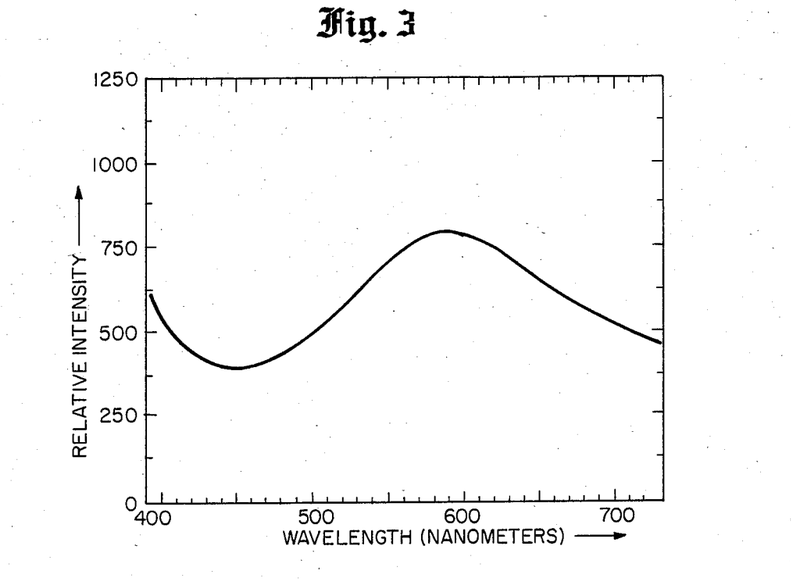
FIGS. 3 through 7 are plots of intensity vs. wavelength for the system of FIG. 1.

Now, turning back to the plot of FIG. 3, it may be noted that there are two extreme points, a minimum at a wavelength of approximately 450 nanometers, and a maximum at approximatel 590 nanometers. Using the formula indicated by block 82 in FIG. 10, the flying height may be calculated to be approximately 474 nanometers, or approximately 18.7 micro-inches.

Figure 4:
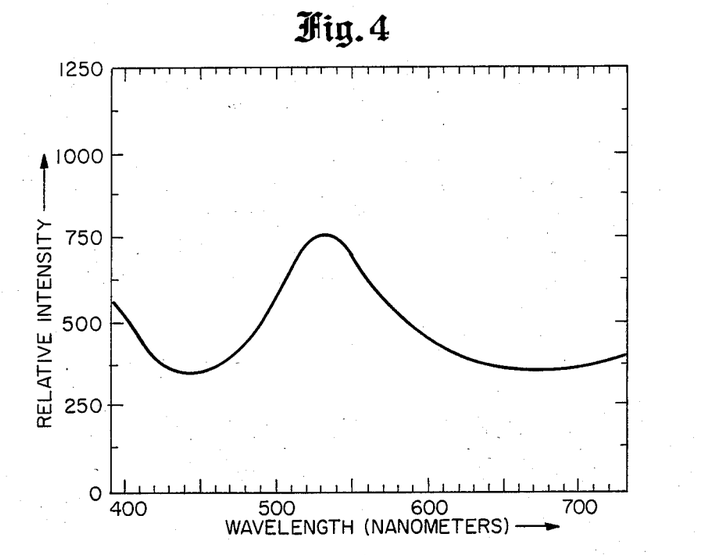

In FIG. 4, there is a minimum at approximately 450 nanometers and a maximum at 530 nanometers, as well as an additional minimum. Using only the first two values, the flying height is calculated to be approximately 745 nanometers, or approximatel 29 micro-inches. If it is desired to have a more accurate determination of the flying height, the central maximum and the second minimum may be employed, to make a second estimate, and these may be averaged, all as discussed hereinabove.

Figure 5:
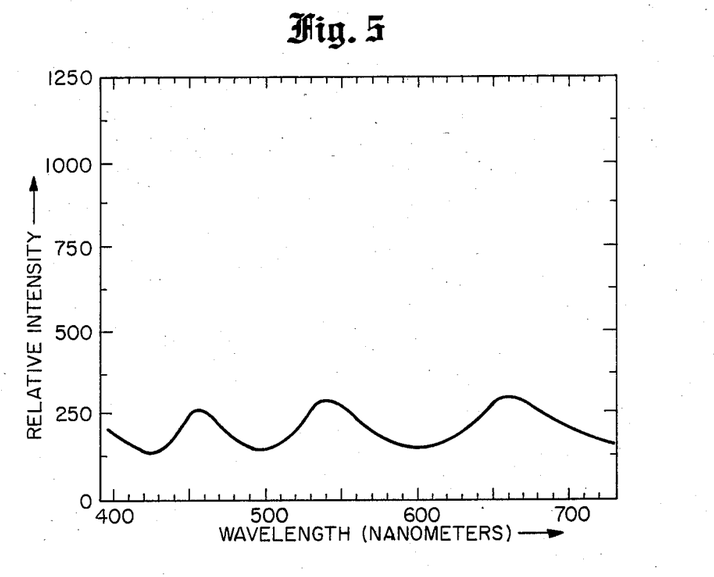

Concerning FIG. 5, it is initially noted that because of the multiple maxima and minima, it is clear that the spacing is relatively large. In proceeding with the calculation as set forth in block 82 of FIG. 10 of the drawings, the first maximum occurs at approximately 455 nanometers, and the first minimum at approximately 496 nanometers. This gives a spacing of approximately 1,346 nanometers, or approximately 53 micro-inches. Further checking of successive maxima and minima indicates that this initially determined value may be slightly low and that the true value may be somewhat higher. However, the details of these additional calculations will not be set forth at this point.

Figure 6:
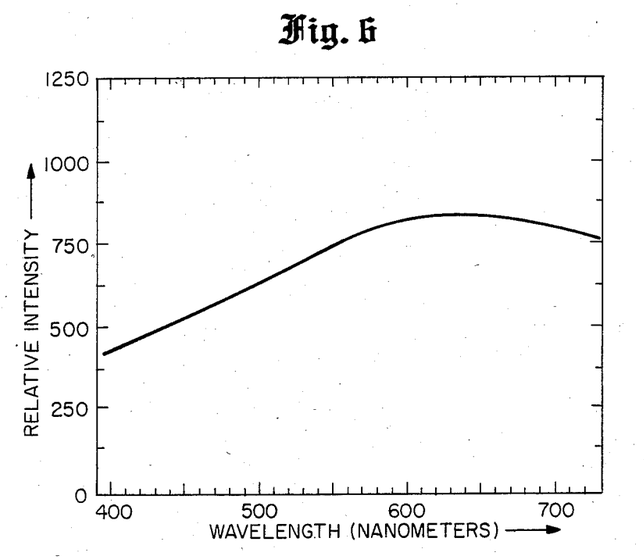
Figure 7:
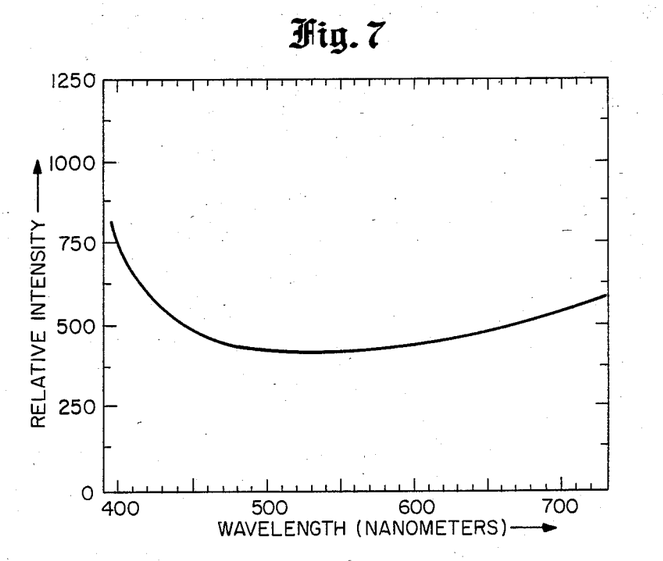

Referring now to FIG. 6, there is only a single maximum, at 640 nanometers. Using the formula in block 88 of FIG. 10, tbe result is a relatively small spacing of approximately 6.3 micro-inches. Similarly, in FIG. 7, there is only a single minimum at approximately 535 nanometers, giving a relatively small spacing, which may be calculated through the use of the formula in block 86 of FIG. 10 to be approximatel 10.5 micro-inches.

Figure 8:
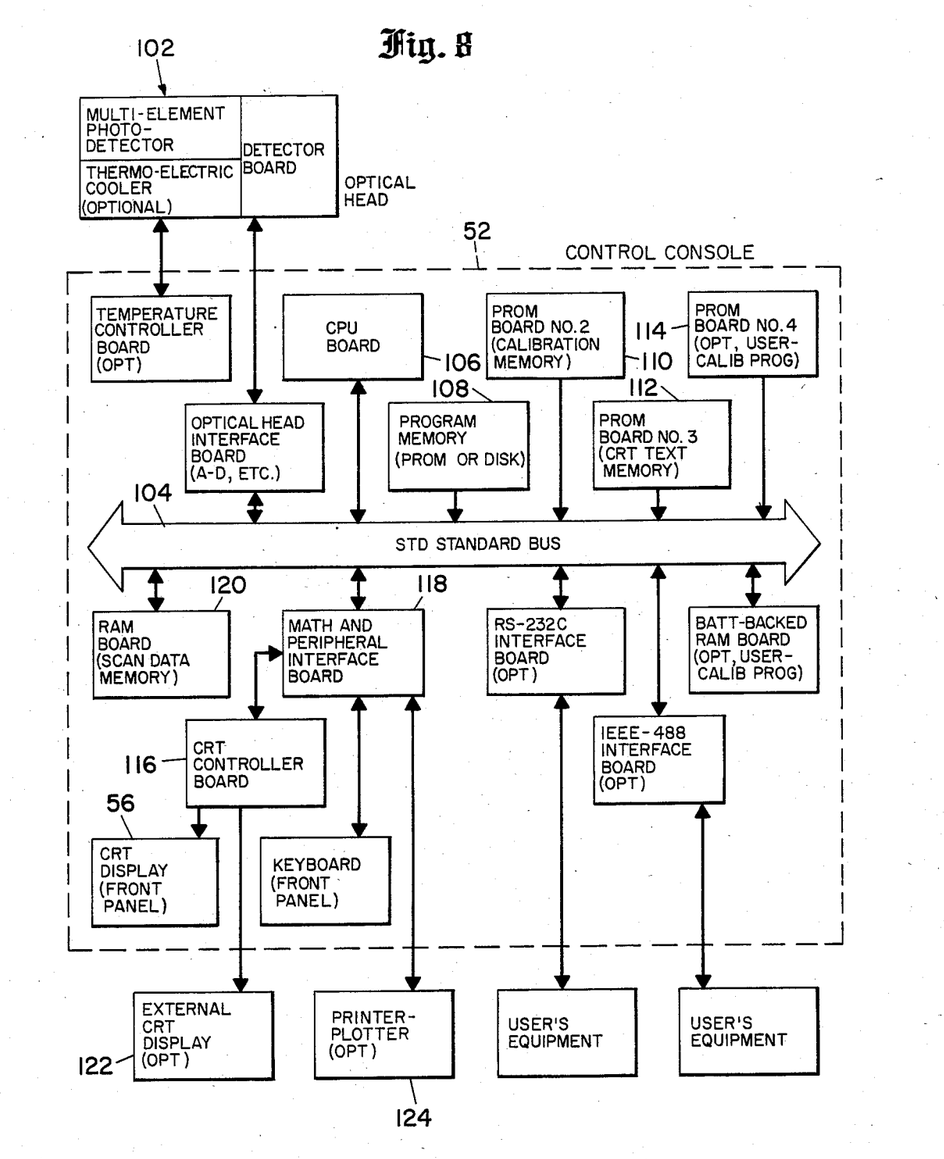
FIG. 8 is a block circuit diagram showing a microprocessor which may be employed in the implementation of the invention.

Now, proceeding to a consideration of the block diagram of FIG. 8, this is the standard block diagram for the commercially available system designated the "Fast Spectral Scanning System" available from the Photo Research Division of Kollmorgen Corporation, at 3000 North Hollywood Way, Burbank, Calif. 91505. The system under consideration is designated the 703A/702AM system, and carries the overall part designation PR710/M.

In FIG. 8, the optical head 102 includes the elements of the optical system as shown in FIG. 1 which are external to the unit 52. The unit 52 is set up in a manner similar to many microprocessors, and includes the standard multiconnector bus 104 through which coupling is made to the various associated units by suitable gates which are activated concurrently to permit transfer of information. The control console 52 includes the CPU board 106, and various memory units 108, 110, 112, and 114. The cathode ray tube display 56 is controlled through the controller board 58, which is in turn coupled to the bus 104 by the math and peripheral interface board 118. A random access memory 120 is also provided. The external cathode ray tube 122 and printer plotter 124 are optional but may be employed with the system as described herein. The remainder of the units as shown in FIG. 8 are generally conventional, and are commercially available as noted above, and therefore will not be considered in detail.

Now, referring to the program or sequence diagrams of FIGS. 9, 10 and 11, the program of FIG. 10 has been considered in some detail hereinabove. The sequence of steps in FIG. 10 constitutes an elaboration of the step designated "Analyze", which appears in block 132 of FIG. 9. The other, relatively routine, steps which are set forth in FIG. 9 include the "Start" or "Initialize" step 134, the step of entering the serial number and customer identification, for example, of the hard memory disk, or the particular apparatus being measured, as shown in step 136, the assembling of reference data including the light source characteristics, which are accomplished by the steps 138 and 140, and the collection of data from the sample with the destructive and constructive interference, as indicated by the block 142. The analysis step 132 has been discussed hereinabove in connection with FIG. 10, and also involves the generation of the complete spectral characteristics as shown in the prior figures of the drawings. Step 144 involves the output of the data for example, by displaying the complete characteristic, and also providing a display or a print-out of the flying height.

Figure 11:
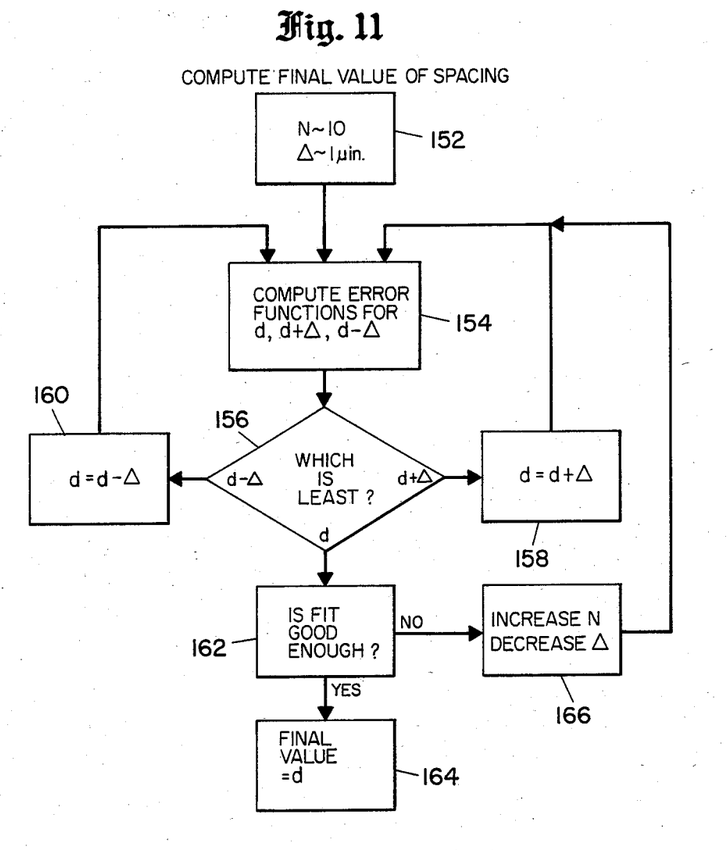

FIG. 11 represents a more accurate or more precise computation of the final value of the spacing. Following the steps indicated in FIG. 10, an approximate curve fitting solution has been obtained, with equation (6) representing the intensity function being located to the actual data on the plot of intensity versus wavelength. The process as set forth in FIG. 11 involves the selection of approximately ten points along the characteristic and the utilization of a deviation designated in FIG. 11 by the Greek letter "delta" from the initially calculated value of "d" for the spacing. As indicated in FIG. 11, by block 152 and 154, the error function is computed for the distance "d", for the distance d+delta or 1 micro-inch, and for the distance d−1 micro-inch. This is accomplished for 10 points along the theoretical curve, and these values are matched with the actual values of the characteristic as measured in the spectral analysis. The diamond 156 indicates that the deviations are averaged for each of the three cases, and a determination is made as to which of the three gives the least deviation. If the average deviation is smallest for d+delta, block 158 indicates the selection of a new value of d which is increased by 1 micro-inch. Similarly, if the lowest average deviation was found from d−delta, block 160 indicates that the value d is then reduced by 1 micro-inch, the value of delta. However, if the repetitive calculation indicates that the least deviation is obtained with the spacing "d", we proceed to block 162. If this value is sufficiently accurate, the final value of "d" is employed, as indicated by block 164. However, in the event that higher accuracy is required, then a greater number of points, and a reduced value of the deviation may be employed, as indicated by block 166, and the process may be repeated.

Incidentally, certain supplemental matters should be noted in connection with the present invention and specification. In many of the relationships it has been assumed that there is air in the spacing being measured. In the event that the spacing is a medium having a high index of refraction, this would require a minor correction to the calculations of a type known per se. Concerning the use of the terms frequency spectrum or wavelength spectrum, for example, either term shall encompass the other in view of their interdependence. With regard to the use of cosine or sine functions, they are, of course, interchangeable, with the addition of a phase factor. In the calculations of spacing from intensity vs. wavelength information, the sine or cosine function includes an "argument" including spacing and wavelength. Following correlation or fitting of the theoretical curve to the actual measured curve, two measured intensity levels at two different known wavelengths may be employed to determine the difference in the "argument"; and the distance may then be determined from the known values of the wavelength, and from the difference in the "argument". It may be noted that this technique was employed to develop the function which appears in block 82 of FIG. 10, as applied to successive extreme points.

In conclusion, it is to be understood that the foregoing detailed description and the accompanying drawings relate to preferred embodiments and methods illustrating the principles of the invention. The invention could also be implemented using spectral ranges extending into the ultraviolet and/or infrared. In addition, the precise form of the optical system and the logic circuitry could be varied, while still accomplishing the same end result. Accordingly, the present invention is not limited to the embodiments and methods precisely as described above and as shown in the drawings.

What is claimed is:

1. A method for determining the distance or spacing between a magnetic reading head and a hard magnetic storage disk, comprising the steps of:
   temporarily replacing the magnetic storage disk with a transparent disk having a surface mounted in substantially the same location relative to at least one magnetic reading head, as the recording surface of the hard disk;
   rotating the transparent disk at substantially the normal rotational velocity of said magnetic recording disk, with the magnetic head being mechanically biased toward said transparent disk, whereby the magnetic head is spaced away from said transparent disk by a distance determined by the outward force of the air pressure resulting from rotation of the transparent disk balanced against the inward mechanical biasing of the head toward the disk;
   directing a broad spectrum of light through said transparent disk onto said magnetic head;
   combining the light reflected from said magnetic head and from the surface of said transparent disk to provide a combined light wave spectral intensity response with constructive and destructive interference at different wavelengths;
   detecting and measuring the intensity of the combined light through a broad spectrum of wavelengths, with the detecting of intensity occurring substantially concurrently for the entire spectrum of wavelengths;
   correlating the theoretical light intensity vs. wavelength characteristic with the measured combined light intensity vs. wavelength characteristic; and
   determining the actual spacing between the magnetic head and the transparent disk from the correlation.

2. A method as defined in claim 1 including the step of changing the spacing between said slider and said disk following a determination of the actual spacing.

3. A method as defined in claim 1 including the step of counting the number of intensity maxima and intensity minima within the measured spectrum.

4. A method as defined in claim 1 including the step of measuring the wavelengths at which successive extreme intensity points, maximum or minimum intansity points, occur, and calculating the spacing "d" from the following equation:

$$d = \frac{1}{4\left(\frac{1}{L_1} - \frac{1}{L_2}\right)}$$

where d is the spacing, and $L_1$ and $L_2$ are the two successive wavelengths.

5. A method as defined in claim 1 including the step of counting the number of maximum and minimum points within the measured spectrum, and if there is only one minimum at wavelength L calculate the spacing from the following expression:

$$d = L/2$$

where d is the spacing, and L is the wavelength at which the minimum occurs.

6. A method as defined in claim 1 including the step of counting the number of maximum and minimum points within the measured spectrum, and if there is only one maximum at wavelength L calculate the spacing from the following expression:

$$d = L/4$$

where d is the spacing, and L is the wavelength at which the maximum occurs.

7. A method as defined in claim 1 wherein the theoretical intensity vs. wavelength characteristic is in the following general format:

$$C_o^2\left[1 - C_1 \cos\left(\frac{4\pi d}{L}\right)\right]^2$$

where CO and $C_1$ are constants, d is the spacing, and L is the wavelength at which the intensity is being measured.

8. A method as defined in claim 1, wherein said theoretical intensity vs. wavelength characteristic includes cosine function of an argument including the wavelength and the spacing, and said method including the steps of determining from the actual intensity levels at two different known wavelengths the difference in said argument, and the step of determining said spacing from the said difference and said known wavelengths.

9. A method as defined in claim 1 including the step of measuring the light intensity at each of at least 100 different wavelengths through the visible light spectrum.

10. A method as defined in claim 1 including the step of measuring the light intensity at each of at least 200 different wavelengths through the visible light spectrum.

11. A method for determining the spacing or distance between two spaced surfaces under dynamic operating conditions comprising the steps of:
locating two surfaces spaced apart but close to one another, under dynamic operating conditions;
directing a broad spectrum of light onto said surfaces;
combining the light reflected from said two surfaces to provide a combined light wave spectral intensity response, with constructive and destructive interference at different wavelengths;
detecting and measuring the intensity of the combined light through a broad spectrum of wavelengths, with the detecting of intensity occurring substantially concurrently for the entire spectrum of wavelengths;
correlating the theoretical light intensity vs. wavelength characteristic with the measured combined light intensity vs. wavelength characteristic; and
determining the actual spacing between the two spaced surfaces from the correlation.

12. A method as defined in claim 11 including the step of changing the spacing between said two spaced surfaces following the determination of the actual spacing.

13. A method as defined in claim 11 including the step of counting the number of intensity maxima and intensity minima within the measured spectrum.

14. A method as defined in claim 11 including the step of measuring the wavelengths at which successive extreme intensity points, maximum or minimum intensity points, occur, and calculating the spacing "d" from the following equation:

$$d = \frac{1}{4\left(\frac{1}{L_1} - \frac{1}{L_2}\right)}$$

where d is the spacing, and $L_1$ and $L_2$ are the two successive wavelengths.

15. A method as defined in claim 11 including the step of counting the number of maximum and minimum points within the measured spectrum, and if there is only one minimum at wavelength L calculate the spacing from the following expression:

$$d = L/2$$

where d is the spacing, and L is the wavelength at which the minimum occurs.

16. A method as defined in claim 11 including the step of counting the number of maximum and minimum points within the measured spectrum, and if there is only one maximum at wavelength L calculate the spacing from the following expression:

$$d = L/4$$

where d is the spacing, and L is the wavelength at which the maximum occurs.

17. A method as defined in claim 11 wherein the theoretical intensity versus wavelength characteristic is in the following general format:

$$C_o^2\left[1 - C_1 \cos\left(\frac{4\pi d}{L}\right)\right]^2$$

where $C_0$ and $C_1$ constants, d is the spacing, and L is the wavelength at which the intensity is being measured.

18. A method as defined in claim 11, wherein said theoretical intensity vs. wavelength characteristic includes cosine function of an argument including the wavelength and the spacing, and said method including the steps of determining from the actual intensity levels at two different known wavelengths the difference in said argument, and the step of determining said spacing from the said difference and said known wavelengths.

19. A method as defined in claim 11 including the step of measuring the light intensity at each of at least 100 different wavelengths through the visible light spectrum.

20. A method as defined in claim 11 including the step of measuring the light intensity at each of at least 200 different wavelengths through the visible light spectrum.

21. In a system involving the determination of a relatively small spacing between two surfaces under dynamic operating conditions, the combination comprising:

first and second surfaces having a transparent medium therebetween;
means for dynamically shifting the relationship of said surfaces with respect to one-another;
means for directing broad spectrum light for reflection from said first and second surfaces and for combining the reflected light waves to produce constructive and destructive interference;
means for detecting and determining the intensity of the combined reflected light at a large number of wavelengths throughout a broad spectral light range, with the detecting of intensity occurring substantially concurrently for the entire spectrum of wavelengths; whereby a light intensity vs. wavelength characteristic is obtained normally having one or more maximum and/or minimum points;
means for counting the number of maximum and minimum points in said characteristic;
means for correlating the cyclically varying theoretical light intensity vs. wavelength characteristic as a function of wavelength and the spacing of said surfaces with the determined light intensity vs. wavelength characteristic, and for determining said spacing from said correlation, and from the number of maximum and minimum points in the determined characteristic.

22. A system as defined in claim 21 including means for determining the wavelengths at which successive extreme points, maximum or minimum points, occur, and for determining the spacing in accordance with the following equation:

$$d = \frac{1}{4\left(\frac{1}{L_1} - \frac{1}{L_2}\right)}$$

where d is the spacing between the two surfaces, and $L_1$ and $L_2$ are the two successive wavelengths at which extreme points of intensity occur.

23. A system as defined in claim 21 in which the theoretical intensity vs. wavelength characteristic includes a cosine function of an argument including the wavelength and the spacing, and in which said system includes means for determining from the actual intensity levels at two different known wavelengths the difference in said argument, and includes means for determining said spacing from said difference and said known wavelengths.

24. A system as defined in claim 21 wherein if said count of maxima and minima indicates that there is only one minimum point, and the minimum point is located at a wavelength L, means are provided for indicating that the spacing between said two surfaces is equal to L/2.

25. A system as defined in claim 21 wherein if said count of maxima and minima indicates that there is only one maximum point, and the maximum point is located at a wavelength L, means are provided for indicating that the spacing between said two surfaces is equal to L/4.

26. A system as defined in claim 21 including means for changing the spacing between said two surfaces following initial determination of said spacing.

27. A system as defined in claim 21 including means for determining the intensity of the reflected light at at least 100 different wavelengths throughout the visible spectrum.

28. A system as defined in claim 21 including means for determining the intensity of the reflected light at at least 200 different wavelengths through the visible spectrum.

29. A system as defined in claim 21 including diffraction grating means and diode array mean for measuring the light intensity at a large number of wavelengths throughout the broad spectral light range.

* * * * *